J. R. HAINES.
Self-Locking Hook.

No. 224,423.  Patented Feb. 10, 1880.

WITNESSES:
C. Neveux
C. Sedgwick

INVENTOR:
J. R. Haines
BY Munn & Co.
ATTORNEYS.

UNITED STATES PATENT OFFICE.

JOEL R. HAINES, OF MOUNT LAUREL, NEW JERSEY.

SELF-LOCKING HOOK.

SPECIFICATION forming part of Letters Patent No. 224,423, dated February 10, 1880.

Application filed December 22, 1879.

*To all whom it may concern:*

Be it known that I, JOEL R. HAINES, of Mount Laurel, in the county of Burlington and State of New Jersey, have invented a new and useful Improvement in Self-Locking Hooks, of which the following is a specification.

Figure 1:
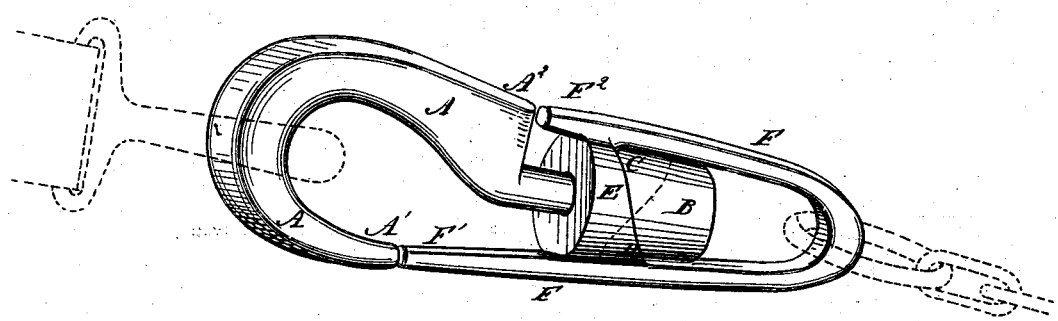
Figure 2:
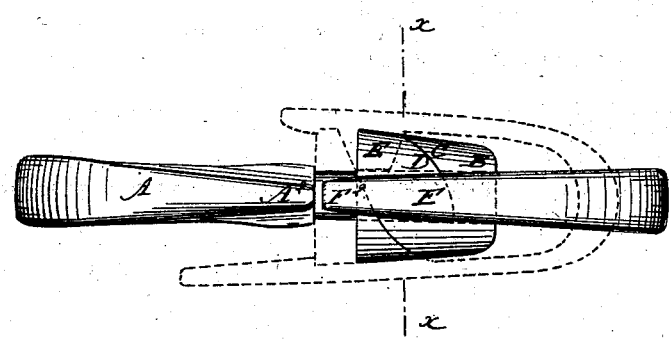
Figure 3:
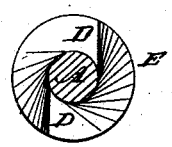

Figure 1 is a perspective view of my improvement. Fig. 2 is an under-side view. Fig. 3 is a sectional view taken through the line $x$ $x$, Fig. 2.

Similar letters of reference indicate corresponding parts.

The object of this invention is to furnish hooks so constructed that the weight of traces or other tension strain will hold the hooks locked to prevent them from becoming accidentally unhooked.

The invention consists in forming upon the shank of the hook a toothed head, a toothed collar placed upon the rounded shank of the hook to engage with the toothed head, and a loop or half-link attached to the toothed collar to receive the trace or other article and serve as a guard to prevent the hook from becoming accidentally unhooked, as will be hereinafter fully described.

A represents a hook, the end part of the shank of which is made round, and has a cylindrical head, B, attached to its end. Upon the forward end of the head B is formed a double incline or two ratchet or clutch teeth, C, to engage with two similar inclines or teeth, D, formed upon a cylindrical collar, E, placed upon the rounded part of the shank of the hook A.

To the opposite sides of the collar E are attached the arms of a loop or half-link, F, in such a position that the said loop, when the collar E is in gear with the head B, may be in the same plane with the hook A.

One of the arms, $F^2$, of the loop F projects close to the shoulder $A^2$ of the hook A, and its other arm, $F'$, projects close to the point $A'$ of the said hook A, as shown in Fig. 1.

In using the device as a trace-hook the hook A is hooked into a ring or eye attached to the end of the short or half tug, and the loop F receives a link of the trace. By turning the loop F and collar E one-quarter around the hook A can be hooked into and removed from the ring or eye of the tug.

With this construction the weight or strain of the trace or other object will hold the collar E down against the head B, and will thus prevent the hook A from becoming unhooked.

Having thus described my invention, I claim as new and desire to secure by Letters Patent—

1. As an improved article of manufacture, a hook formed substantially as herein shown and described, consisting of the hook A, the toothed head C B, the toothed collar D E, and the loop F, so that the weight or strain upon the hook will hold the hook locked, as set forth.

2. In a self-locking hook, the combination of the toothed head C B, attached to the shank of the hook A, and the toothed sleeve D E, carrying the loop F, substantially as herein shown and described, so that the hook will be held locked by the strain upon it, as set forth.

3. In a self-locking hook, the combination of the loop F, carrying the toothed sleeve D E, and provided with projecting arms $F'$ $F^2$, with the hook A, having the point $A'$ and shoulder $A^2$, substantially as herein shown and described, to serve as a stop and lock to the hook, as set forth.

JOEL R. HAINES.

Witnesses:
W. H. BISHOP,
THOMAS E. FRENCH.